(12) United States Patent
McClintock et al.

(10) Patent No.: US 10,154,052 B1
(45) Date of Patent: Dec. 11, 2018

(54) TRACER COOKIES TO DETECT WEB SESSION COMPROMISE BY INSIDERS

(71) Applicant: Amazon Technologies, Inc., Reno, NV (US)

(72) Inventors: Jon Arron McClintock, Seattle, WA (US); George Nikolaos Stathakopoulos, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 578 days.

(21) Appl. No.: 14/286,247

(22) Filed: May 23, 2014

(51) Int. Cl.
*H04L 29/06* (2006.01)

(52) U.S. Cl.
CPC .................. *H04L 63/1425* (2013.01)

(58) Field of Classification Search
CPC ............. H04L 63/1441; H04L 63/1466; H04L 63/1416; H04L 63/1425; H04L 2463/082; H04L 63/14; H04L 63/1408; G06F 2221/2119; G06F 21/56
See application file for complete search history.

(56) References Cited

U.S. PATENT DOCUMENTS

| | | | |
|---|---|---|---|
| 9,361,446 B1* | 6/2016 | Demirjian | G06F 21/36 |
| 2004/0098493 A1* | 5/2004 | Rees | G06F 21/6218 |
| | | | 709/229 |
| 2007/0234409 A1* | 10/2007 | Eisen | H04L 63/0876 |
| | | | 726/6 |
| 2008/0072289 A1* | 3/2008 | Aoki | H04L 43/0811 |
| | | | 726/3 |

* cited by examiner

*Primary Examiner* — Tri M Tran
(74) *Attorney, Agent, or Firm* — Davis Wright Tremaine LLP (57) ABSTRACT

Complex web applications may be susceptible to cyber-attacks that affect the security of customer sessions. Session theft and exploitation may be predicted and controlled by monitoring records of requests made to the web application and providing notifications of possible compromise of a session, session service or a machine using a session service.

20 Claims, 8 Drawing Sheets

TRACER COOKIES TO DETECT WEB SESSION COMPROMISE BY INSIDERS

BACKGROUND

Large and complex web applications are becoming increasingly prevalent, which may cause a number of issues including controlling administrative access to the web application, maintaining the web application in a manner that is secured from malicious attacks and ensuring that customer sessions with the web application are secure and have not been compromised. When many employees or teams are responsible for developing, deploying and maintaining the web application, the risk of malicious attacks can greatly increase and become harder to prevent when ownership is decentralized. As websites grow, recent research indicates that up to 75% of cyber-attacks occur at the web application level. Current methods of ensuring customer session security include two-factor or multi-factor authorization in an attempt to avoid session theft. However, multi-factor authentication only provides an authenticated session that is still vulnerable to session theft.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods and systems for detecting, mitigating and resolving website session theft. Generally, session theft, also referred to as cookie hijacking, includes a malicious party, such as a hacker, exploiting a valid computer session in order to gain unauthorized access to information on a computer system or network. A computer session, generally referred to as a session, is a temporary or semi-permanent interactive information exchange or dialogue between two or more customer devices in order to initialize communication between the devices, such as client-server communication. Example embodiments of a session are generally established or created at a certain point and torn down or disconnected at a later point. Generally, upon creation of a session, a session identifier (ID), session token or other state identifier is associated with the created session in order to identify the session by a connected device. A session ID may be associated with a user and session information or actions by the user are generally stored on a web server using the session ID.

A session may be stolen by an attacker by one of many methods, such as by an inline program (e.g., a man-in-the-middle attack), a source-routed Internet protocol method, blind hijacking and cross-site scripting. In some example embodiments, session theft is detected and remedied, at least in part, by tracking the session using a tracing system and tracer session.

In some example embodiments, a tracer system is a control system configured to generate requests for creation of a session; the tracer system may be implemented in a computer or a series of computers as part of a distributed system. The tracer system may include components configured to generate unused sessions, create sessions with fake traffic or monitor traffic in live customer sessions.

In example embodiments, a tracer system generates requests to a web application. The tracer system may have multiple functionalities that are used for detecting when an attacker, such as a hacker or a malicious insider of the company, owning the web application, is compromising a session. The tracer system may be configured to maintain a record of the sessions that are created and being monitored and maintain a record of the expected behavior of those sessions. A session may be created at a back-end server by the web application, where the created session is maintained in a dormant state. A dormant session may be a session that is ignored, it may never be used or it may not be used for a specified amount of time. As a result of activity associated with the dormant session being detected, a tracer system may be configured to determine that there is an issue with the session, such as a possible compromise or exploitation of the session.

For example, if a session were created for the specific purpose of remaining dormant, then the expected behavior would be to detect no activity in the session. The tracer system may further be configured to reconcile the records maintained about the session with the information or data recorded in the server logs for the web application. Generally, a server log is a logged file or multiple log files automatically created and maintained by a server of activity performed by or on the server, such as each request made to the server.

In some example embodiments, instead of having a dormant session, the tracer system may generate, take or test data that emulates real customer traffic, without using an actual customer session. The tracer system may generate hundreds or more requests to the web application and record hundreds of entries in a log. Again, such a tracer system may be configured to compare its log to the server log and ensure the records match.

In various embodiments, tracer sessions are established through conventional session creation mechanisms and, once created are strictly controlled and used by an automated process. The automated processes may be configured to generate (i.e., cause a computer system executing the automated process to generate) a request to the web application and each generated request may be recorded in a session ledger including request information or attributes such as a Uniform Record Identifier, a method of making the request, a time the request is made and the session used to make the request. The automated processes or other network component processes include a mechanism for detecting possible web session compromise by comparing the web application server logs to the session ledger. Sessions are detected as having been compromised as a result of a request generated by an automated process of the tracer system, when such a request is not recorded in the session ledger. When it is determined that a specific session has been compromised, a network administrator or other party may review the web pages and access points associated with the session in order to investigate the reason for the compromise.

The tracer system may be configured to generate a request or a series of requests to a web application on a regular basis and maintain a record of the time of the request, the Uniform Resource Locator (URL) to which the request was sent, a session list and other attributes that may be relevant or normally maintained in a log. The tracer system may be a control system to generate requests for creation of a session and match the maintained records to the server log. Requests may be authorized in multiple ways or considered to be an authorized request according to different rules or use cases. For example, a service provider may be authorized to send a request on a session as part of a fraud detection use case, and a customer or client may be authorized to send a request in the same or similar manner. In other words, in different example embodiments, different entities may be authorized to send requests on a session. In an example where a request on a session would be authorized for a certain entity or group of entities, any requests from another entity for which the session was not created, would be considered unauthorized requests, such as when that entity did not otherwise have authorization to submit the requests from someone with authority to grant such authority.

In some example embodiments, instead of using generated traffic that emulates customer traffic, a live customer session may be used in order to monitor real user traffic for possible session theft or session exploitation. The tracer system may monitor live customer sessions and compare server logs to logs maintained or accessed by the tracer system. If the server logs and tracer system logs are incongruent, a notification may be transmitted providing a warning of a potential compromise.

If a compromised session is detected, a system administrator or other interested party may attempt to analyze the session and determine factors used to identify the attacker. For example, a system administrator may tailor the compromised session that may make the session more interesting to the attacker in order to identify the attacker or prevent the attacker from causing damage or being productive. For example, the administrator may make the session more interesting to the attacker by identifying the session a fresh session or a stale session, make the session location-based or time-based and/or generate false data.

Once a session has been identified as being stolen or compromised, a network or system administrator, for example, may use different methods to protect the rightful customer of the compromised session. For example, the administrator may de-authenticate an authenticated session, causing the user or customer to re-enter security information, such as user name and password. The administrator could further completely invalidate the session, and issue a new session automatically or upon receipt of a request for a new session, could escalate the security requirements by requiring additional factors for authentication, such as requiring a second batch of identification, issue a two-factor authorization or a dynamic challenge question, such as the user's security questions. If it is determined that a customer is being continuously or repeatedly compromised, a network administrator, for example, may make reactive decisions based on the cause, such as attempting to identify the distinction of the customer to determine reasons for the compromising or having to release the customer until the customer can fix the problems causing the compromise.

In some example embodiments, an indicator of compromise (IOC) is an indicator that may be observed by a network or users of a network that indicates a likelihood of some form of intrusion or compromise of a system, file, session or the like. An IOC may be used, according to example embodiments presented herein to detect future attacks. For example, an IOC may be detected by a user on a network and that user may share the IOC with a network administrator, other used of the network or users on a Uniform Record Indicator (URI) on which the IOC was detected in order to share information of a possible compromised system or component of a system, such as a file or session. The tracer system may utilize an IOC detected or received from another source in order to determine if an attacker may use a session in an unauthorized manner.

Figure 1:
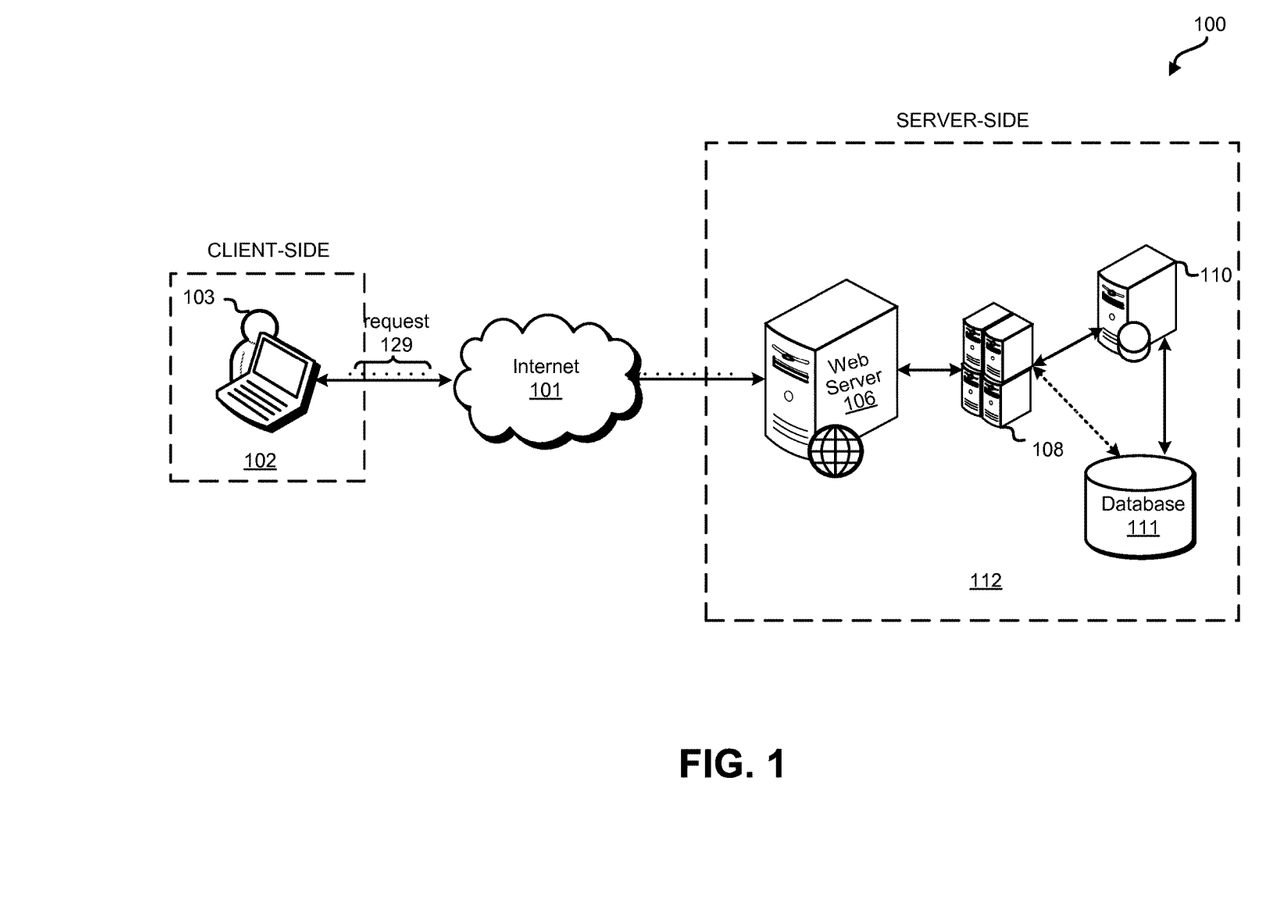
FIG. 1 is an illustrative example of an environment in accordance with at least one embodiment.

FIG. 1 is an example embodiment of an environment 100 for implementing aspects in accordance with various embodiments. As will be appreciated, although an Internet environment 100 is used for purposes of explanation, different environments may be used, as appropriate, to implement various embodiments. The environment includes an electronic client device 102, which can include any appropriate device operable to send and/or receive requests, messages or information over an appropriate network 101 and, in some embodiments, convey information back to a user of the device. The client devices may include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof.

Example embodiments include a customer 103 browser on the client-side 102 transmitting a request 129 to a web server 106 located on a server-side 112 via the Internet 101. The web server 106 may be configured to forward or transmit the request to a web application server 108 when the request is for a web application or service located on or operably interconnected to a web application server 108. The request may be transmitted directly from the client-side to a web application server hosting the requested web application. The web application server may host multiple web applications and be operably interconnected with additional network components, such as a proxy server or additional web application servers. Various embodiments include web application server 108 being operably interconnected with a database server 110, which is used to retrieve data from a database 111. The web application server 108 may further be directly connected with one or more databases in order to store, modify and/or retrieve data in the database according to the client request.

Figure 2:
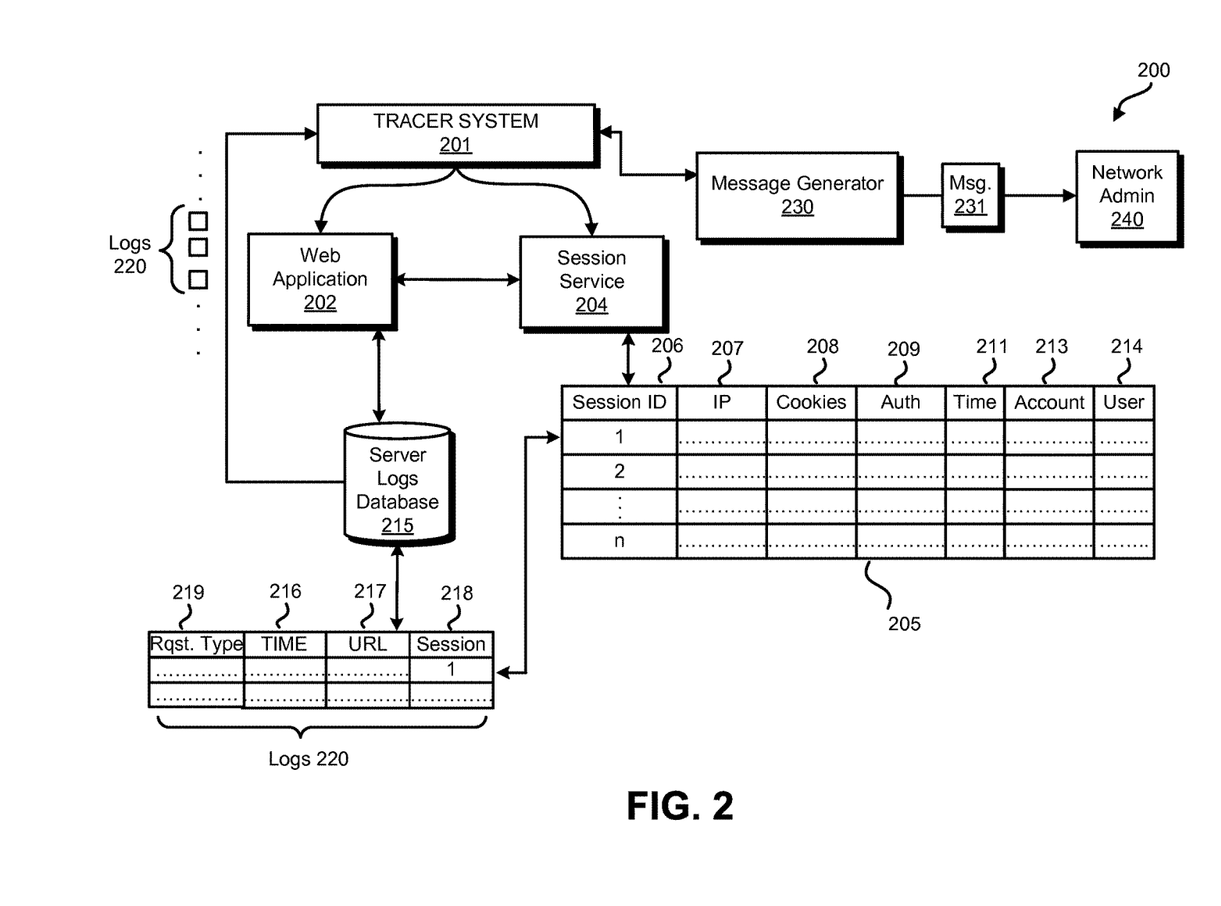
FIG. 2 is an illustrative example of a block diagram in which various embodiments can be implemented.

FIG. 2 is an illustrative example of an environment 200 showing a tracer system according to one embodiment. The tracer system may be a computer or multiple computers configured as part of a distributed system. The tracer system 201 is configured to create a new session for use in determining possible session compromise or potential exploitation of the session or session service by an attacker. The new session may include, for example, a new session identifier (ID), a timestamp, a referrer Uniform Record Identifier (URI), an Internet protocol address, an entry point (e.g., a starting webpage) and other attributes that may be applicable or useful for determination of session compromise or exploitation.

A new session may be created by a client via a session service 204 or at a server via a web application 202. Generally, a session service may be configured to perform many tasks, for example, a session service may be configured to generate session identifiers (ID), maintain session state information, provide session management interfaces, generate session life events such as session creation and destruction and the like. A session service may be configured to include a session Application Programming Interface (API) for resolving session ID problems and caching or storing session information or notification related to the sessions. A session service may further be configured to provide an ability to associate a particular user and user session, provide services for managing a user session, for example, such as the transition of session states based on user actions or other variables. A session service or a session state may include a number of session attributes, such as a session creation time, a maximum idle time, a maximum length of session, a latest access time, client domain information, a client identifier and additional attributes commonly used or hereinafter developed. Alternative example embodiments of session services include using cluster environments or distributed systems to process large batches of new session requests. The session service may be configured to maintain a session ledger 205 that may be created to record information about the created session. For example, the session ledger 205 may record a session ID 206, an Internet protocol address 207, a web or session cookie 208, authorization level information 209, time related to requests 211, an account 213, a user associated with the account 214 and additional attributes or properties related to session creation and session requests.

Example embodiments may further include a new session being created by a web application at a web application server or other operably interconnected server, such as a proxy server. A web application 202 is configured to create a new session when instructed to by a primary system, such as a tracer system 201. The web application is further operably interconnected to a server log database 215, which may be configured to maintain information about requests made to the server. The server log database may contain hundreds of entries such as log 220 that include information about a time of a request 216, a referring Uniform Resource Locator (URL), a session identifier or session list (218) and a Hypertext Transfer Protocol (HTTP) request type (219), such as a GET or a PUSH request.

After a session has been created, the server log 220 is transmitted to the tracer system and is compared to the session ledger 205 to determine if a dormant session has any activity. The activity on the session may be expected or the expected activity is known in advance because the session is controlled, such as being a specifically created session for the purpose of detecting compromise. For example, the session ID 206 is compared to the session ID 218 and if they correspond, that means there is unauthorized activity occurring on the session. When activity is found on a session in such an embodiment, the tracer system is configured to provide the information to a message generator 230, which sends a notification message 231 to a network administrator 240, an automated response system, a dashboard, an alerting system or other network component to identify the possible compromised session, session service or machine using the session service.

A session may be identified according to a session cookie (e.g., small text file), which is generally a temporary cookie file that is stored on the user's device by a client and, in some examples, erased when a customer closes the client. In many examples, a cookie is a key value pair of information that is provided to a server by a client each time the client sends a request to the server in order to have the server identify the client based at least in part on the cookie. In other example embodiments, a general-purpose cookie (e.g., an HTTP cookie, web cookie or browser cookie) may be used; a web cookie is a small piece of data transmitted from the website and stored on a client of the customer's device when the customer is on the website. Each time the customer loads the website, the customer's client must transmit the web cookie to the server with any requests in order to notify a server of previous activity. A session token, secret state, identifier or other secret information may be used in place of a session cookie. Generally, tokens may be used in embodiments presented herein, where a cookie is just one example of a token.

Common uses for cookies include, for example, authentication, storing site preferences, storing shopping cart items and storing server session identification. For example, e-commerce websites that provide a shopping cart generally maintain a session cookie received from the client upon making a request for a webpage. This enables the website to maintain information, such as changes to items in the shopping cart, from each webpage on the website that is visited in order to make all information in the shopping cart available at any page, such as the checkout page. In some example embodiments, instead of storing information at a client using cookies, the client stores a unique session identifier that is passed to a web server each time the client generates a request.

Figure 3:
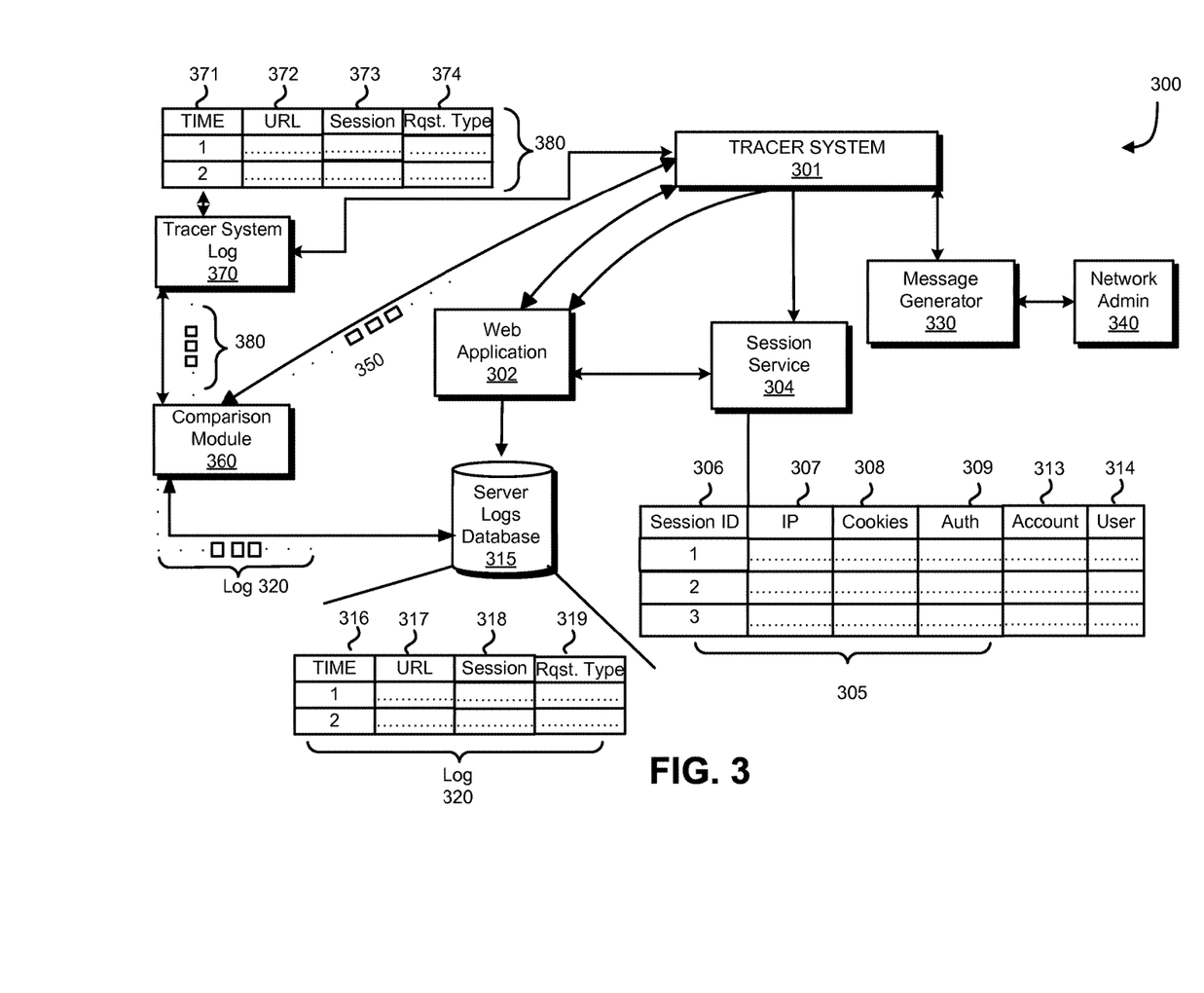
FIG. 3 is an illustrative example of a block diagram in which various embodiments can be implemented.

FIG. 3 is an illustrative example of an environment 300 showing a tracer system according to one embodiment. The tracer system 301 is similar to the embodiment described and illustrated in FIG. 2; however, the tracer system is configured to generate requests to the web application in a manner that may emulate real customer traffic. Example embodiments of the tracer system include creating a new session via the session service 304 or via the web application 302. The new session is a specifically created session that is created with the purpose of being a special session to detect compromise, these specifically created sessions are distinct from other sessions, as the specifically created sessions are not made for an individual (if desired, a client could use one of the specifically created sessions as a secondary use). Where the session service generates a session ledger 305, which includes parameters or properties related to the created session, for example a session identifier (ID) 306, an Internet protocol address 307, a web or session cookie 308, an authentication level 309, an account 313, a user associated with the account 314 and other properties currently known or hereinafter determined useful for session theft identification, such as query parameters of the POST.

Example embodiments of the web application 302 include being operably interconnected with a server log database 315, which maintains a log 320 with session request information, for example, a time 316, a Uniform Resource Locator 317, a session ID or session list 318 and a Hypertext Transfer Protocol (HTTP) request type (219), such as a GET or a PUSH request.

The tracer system may further be configured to transmit a request 350 including passing a session to the web application 302. The tracer system generates a tracer system log 370, which includes a record 380 of the tracer system log for each request transmitted to the web application. The tracer system log may include properties related to the request, including, for example, a time of the request 371, a URL related to the request 372, a session ID 373 and an HTTP request type 374. The tracer log may further include a request identifier, such as a sequence of numbers returned in a header or hidden in a form field of a response. The record 380 and the log 320 are provided to a comparison module 360 to determine if there is unauthorized activity or exploitation of the session. For example, the comparison module may be configured to determine if the number of requests recorded in the record 380 is consistent with the number of requests recorded in the log 320. While example embodiments presented herein show only a few sessions, it will be understood by those of ordinary skill in the art that hundreds or more requests may be made and recorded as entries in the logs. If the comparison module determines that there is a discrepancy in the number of requests recorded, the comparison module may be configured to notify the tracer system, which may use the message generator 330 to provide a notification of a possible compromised session or session service to a network administrator 340 or other network component.

Alternative example embodiments include a tracer system configured to generate a request or a series of requests to the web application on a regular basis and maintain a record of the time of the request, the URL to which the request was sent, a session list and other attributes that may be relevant or normally maintained in a log. The tracer system may further match the maintained records to the server log.

Tracer sessions may be established through normal session creation mechanisms and, once created, are strictly controlled and used by an automated process. For example, the automated processes of the tracer system may generate a request to the web application and each generated request may be recorded in a session ledger including request information or attributes such as a Uniform Record Identifier, a method of making the request, a time the request is made and the session used to make the request. The automated processes or other network component processes include a mechanism for detecting possible web session compromise by comparing the web application server logs to the session ledger. Such processes and components may be generated by a computer or a distributed system comprising multiple computers or may be generated by a system administrator or user to be run by the tracer system.

Example embodiments include determining that a session has been compromised when a request generated by the automated processes of the tracer session is not recorded in the session ledger. When it is determined that a specific session has been compromised, a network administrator or other party may review the web pages and access points associated with the session in order to determine the reason for the compromise. For example, if a tracer system provides a notification to a system administrator that there is a possible exploitation of a session, the system administrator may generate fake data in order to attract the attacker and prevent the attacker from being productive with the exploited session.

Alternative example embodiments include generating a request for a new session outside of the computing environment 300, such as generating the session request a computer hosted by a digital subscriber line or a computing resource service provider. For example, an automated agent, such as a "bot," may be configured to generate a request, where the bot is located in a different computing environment than the tracer system or in the same computing environment as the tracer system. A request may be transmitted by the bot or via an otherwise automated process to generate and send requests; alternatively, the request may be a manual process using transformed real requests. Wherein, generally, a computing environment is a collection of machines, software and networks that support various types of computing solutions. Such an example embodiment may provide for session requests that more accurately represent real Internet traffic from a customer, without using a live customer session. For example, botnets or automated agents may be configured to create fake sessions, fake requests and fake customer traffic in an attempt to emulate a live customer session.

Figure 4:
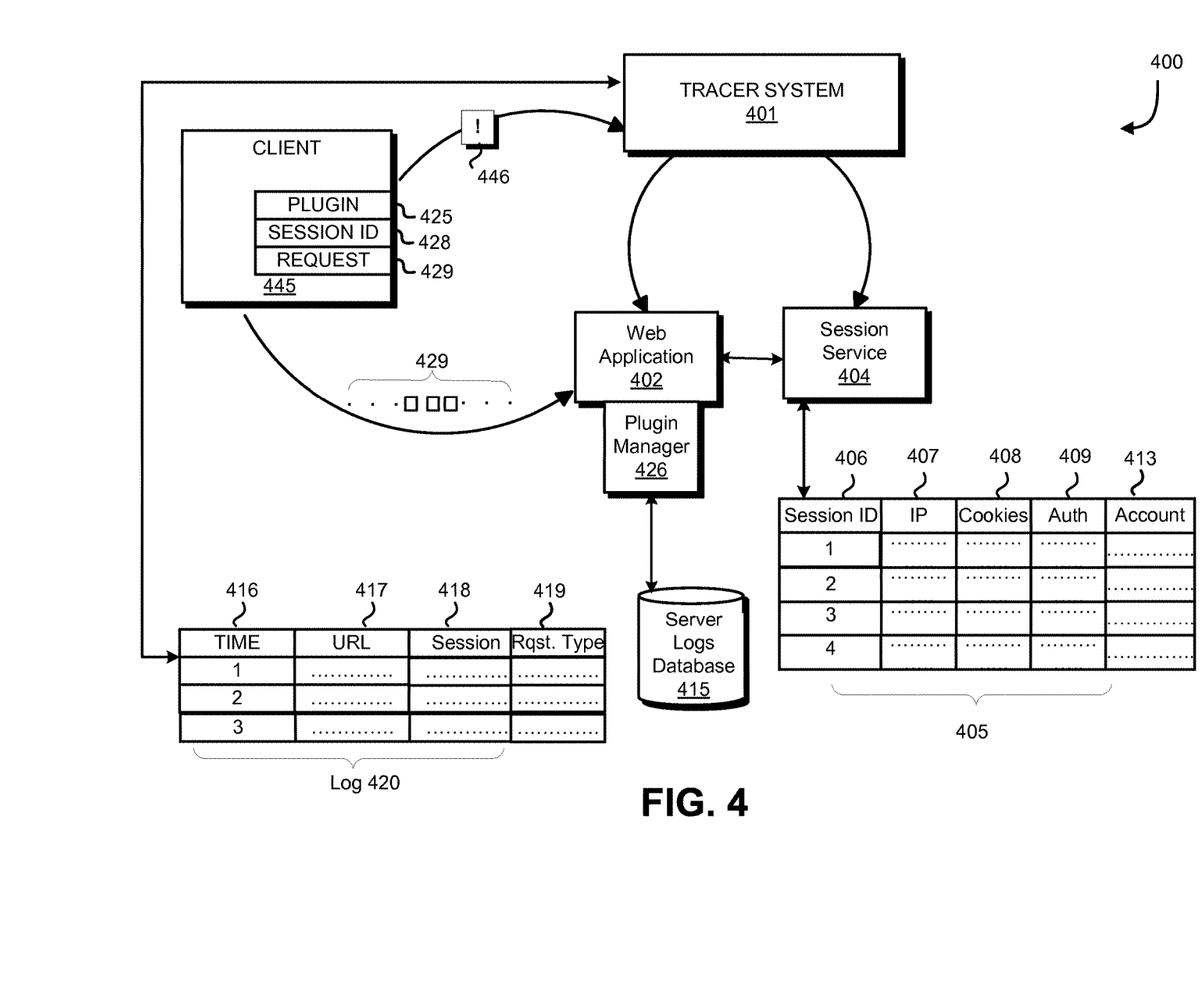
FIG. 4 is an illustrative example of a block diagram in which various embodiments can be implemented.

FIG. 4 is an illustrative example of an environment 400 showing a tracer system according to one embodiment. The tracer system 401 is similar to the embodiments described and illustrated in FIGS. 2 and 3; however, the tracer system is configured to instrument live customer sessions to determine if a session, session service or machine using a session service are compromised.

Example embodiments of a tracer system include using real customer traffic and live customer sessions in order to detect compromised sessions. A tracer system may be used in conjunction with a client (e.g., a customer's web browser), which has a as a client application added to it. The tracer system may further be configured to receive messages by the web application, or components of the web application, such as a software application or a software component (such as a plug-in or an extension). The plug-in may be a normal plug-in added to a client by a customer for any one of many reasons, such as to enable a third-party developer to create extensions to a web application, to add new features to the customer's browser or to the web applications to reduce the size of a web application, etc. Examples of common plug-ins include extensions for a web browser to play certain video and/or presentation formats (e.g., Flash® or QuickTime®), provide for software development environments, e-mail clients, media players and the like.

For example, a message may be transmitted from a plug-in or client application to the tracer system, the message may provide a record of what activity is expected from the specific client to which the plug-in is added. The plug-in may have access to or maintain the session identifier (ID) for the particular session and maintains a record of the requests transmitted from the client to a web application. Each time a request is sent to the web application, the plug-in also transmits a message to the tracer system. The tracer system then maintains a ledger of the requests to the web application based on the information sent from the plug-in to the tracer system. The plug-in may be configured to transmit messages related to session requests to the tracer system and the tracer system may maintain those records in addition to maintaining its own records.

Example embodiments of the tracer system may be operably interconnected with a session service 404 or a web application 402. Where the session service generates a session ledger 405, which includes parameters or properties related to the created session, for example a session identifier (ID) 406, an Internet protocol address 407, a web or session cookie 408, an authentication level 409, an account associated with the created session 413 and other properties currently known or hereinafter determined useful for session theft identification.

The web application 402 may be operably interconnected with a server log database 415, which maintains a log 420 with session request information, for example, a time 416, a Uniform Resource Locator 417, a session ID or session list 418 and a Hypertext Transfer Protocol (HTTP) request type (419), such as a GET or a PUSH request. The web application may further be configured to include or be operably interconnected to a plug-in manager 426, which may be implemented to control and manage a plug-in 425 added to a customer's browser, such as a client 445. The plug-in 425 include information of the session ID and information related to a request transmitted from the client to the web application.

The plug-in may be further be configured to transmit a message 446 to the tracer system providing the information maintained by the plug-in. For example, when a client transmits a request for a new session to a web application, the plug-in transmits, at or near the same time, a message to the tracker system providing the session identifier 428 and the request information 429 that was transmitted from the client to the web application. The tracer system generates a ledger (not shown) of the request generated by the client and the ledger is correlated with the server logs, such as server log 420 to determine if any unauthorized or exploitive activity is present on the session. The message 446 may provide a record of the type of behavior that is expected from the client 445, and may further provide information as to whether an attacker is exploiting the web application. For example, the message may indicate that an attacker is using an attack, such as a man-in-the-middle attack or cross-site scripting vulnerability at the web application to exploit the web application and gain access to the session from the client. The expected behavior may be known in the instant example as the request should only be made by a plug-in enabled browser. An indication of a compromised session somewhere between the client and the web application may be provided to a network administrator or user in order to warn of a possible exploitation of a session, a session service or a machine using the session service.

A web application may maintain a list of sessions for which to record information in a manner that optimizes the matching between logs and enabling the session theft detection to occur in real-time or near real-time. A web application may be provided with or include a list of hashes that are hashed aggregations of some set of requested metadata that the web application is configured to match. For example, if a tracer system is configured to review only requests for a certain path, the tracer system or other network component may instruct the web application to transmit an alert for any requests for the session transmitted from a different path.

Various embodiments may include a proxy server and a client being operably interconnected via a trusted or secure channel, such that there is a tighter coupling between the network components. An owner or controller of a client, such as the client 445, may be able to utilize the proxy server to determine possible session theft. For example, a proxy server may be configured to identify requests for a session that include data created through an eco-system of the owner, and if no data is identified, that is an indication of a possible session theft or exploitation. The proxy server may be configured to identify requests for the same session identifier being transmitted from different devices, therein causing the proxy server to monitor the session identified by the requested session ID to determine if data is being received or transmitted between the different devices, which likely indicates a compromised session. Multiple proxy servers, such as a front-end proxy server and a proxy server, which are configured to monitor different layers or paths, may be included in order to provide additional levels of security and monitoring capabilities.

Figure 5:
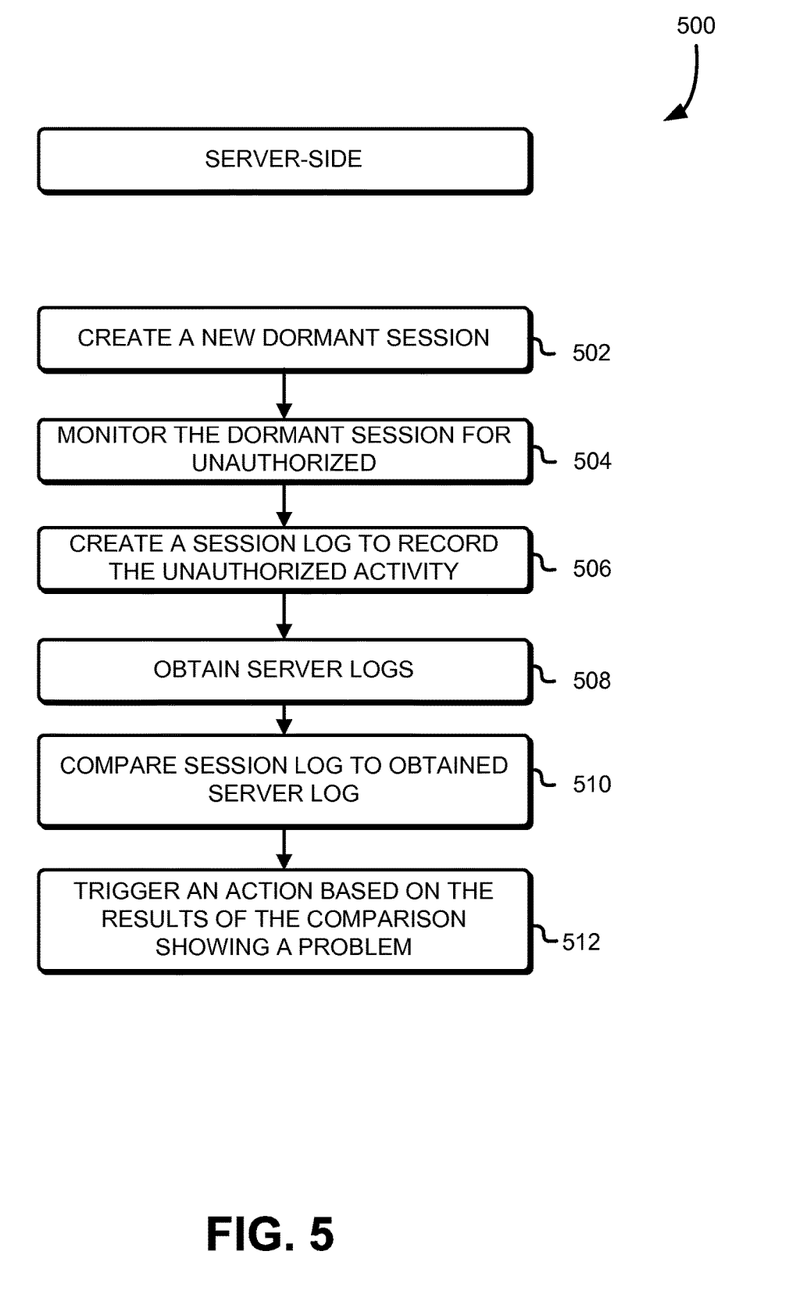
FIG. 5 is an illustrative example of a process for creating dormant sessions in accordance with at least one embodiment.

FIG. 5 is an illustrative example of a process 500 that may be used to create a new session on a server-side in accordance with example embodiments presented herein. The process 500 may be performed by a tracer system or component thereof located on a server-side, such as the tracer system 201 as described and illustrated in connection with FIG. 2.

The process 500 begins by creating, at a server-side, a new computer session, where the session is created (502) with the intention that it not be used or be used only infrequently; effectively, the purpose of creating the new session is to ignore the created session and allow it to be dormant (e.g., not use the session to send requests or receive responses). The tracer system is configured to monitor the dormant session for any activity (504), where the activity would be unauthorized or unexpected activity as the session was created for the purpose of lying dormant. The process 500 continues by the tracer system creating a session log or ledger to record information related to the unauthorized or unexpected activity (506). For example, the tracer system may record information related to the session identifier (ID), session cookies, authorization level information or other session attributes and/or parameters, such as the session ledger 205 described and illustrated in connection with FIG. 2.

Returning to FIG. 5, the tracer system obtains server logs (508), such as server logs stored and/or recorded in the server log database 215 described and illustrated in connection with FIG. 2. Alternative example embodiments may include a server log database or table that is located at the web application or session service used to create the session. The process 500 continues by comparing, at the tracer system or a comparison module interconnected therewith, the session log created by the tracer system with the records obtained from the server logs (510). In example embodiments where the result of the comparison is a negative result, meaning that the comparison yielded no differences or discrepancies between the session log and the server log, then no action is taken. Where the result of the comparison in a positive result, meaning that the comparison yielded one or more discrepancies between the records in the session log and the server log, the tracer system is configured to trigger an action (512). Such a triggered action could include an email or message to a network administrator providing a notification of possible compromised session, a message indicating that the session must be re-authenticated, a message to invalidate the session or other actions that may help ensure the security of the session.

Figure 6:
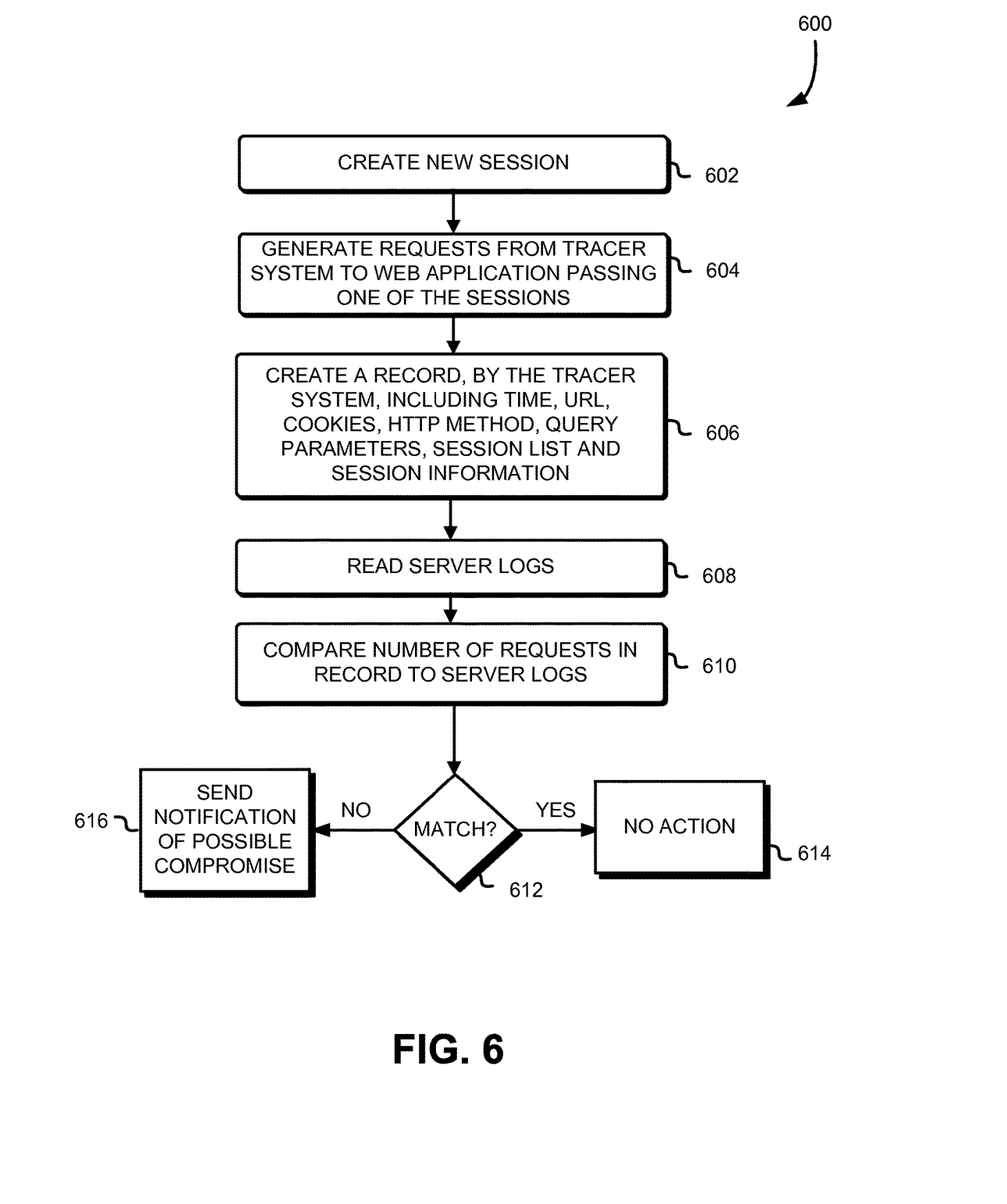
FIG. 6 is an illustrative example of a process for creating requests to a web application in accordance with at least one embodiment.

FIG. 6 is an illustrative example of a process 600 that may be used to create a new session and create requests to be transmitted to a web application in accordance with example embodiments presented herein. The process 600 may be performed by a tracer system or component thereof, such as the tracer system 301 as described and illustrated in connection with FIG. 3.

The process 600 begins with a tracer system creating a new session (602). In alternative example embodiments, the new session may be created by components operably interconnected with the tracer system, such as the web application 302 or the session service 304 as described and illustrated in connection with FIG. 3. Returning the process 600, the tracer system generates requests transmitted to the web application that includes passing a session to the web application (604). In some example embodiments, the generated requests may include false or fake data in order to emulate traffic in a live session. The tracer system further creates a record that includes a timestamp, Uniform Resource Locator (URL) and session list (606), which may be based at least in part on the generated requests transmitted to the web application.

The process 600 continues with the tracer system obtaining or reading server logs (608) in order to receive information related to recorded information at the web application or web application server, such as the web application server 108 described and illustrated in connection with FIG. 1. Returning to FIG. 6, the tracer system or a component thereof performs a comparison between the number of requests in the record to the number of requests in the server logs (610). Additional parameters or factors may be included in the comparison, such as an aggregation of two or more attributes related to the record and/or the server logs. The comparison is performed to determine if the record and server logs match (612), if they do match (614), then no action is necessary; however, if the record and server logs do not match, the tracer system transmits a notification to another network component advising of a possible compromise to a session, the session service and/or a machine running the session service (616).

Figure 7:
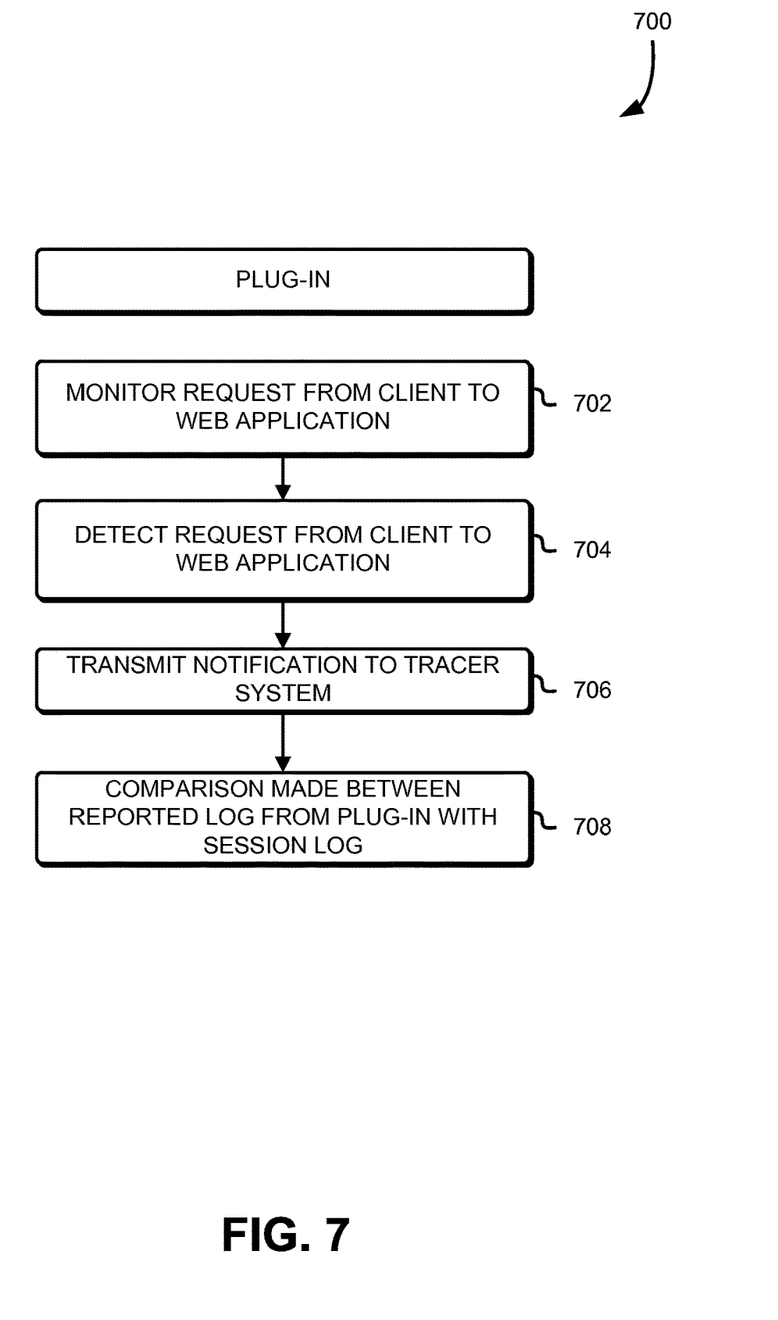
FIG. 7 is an illustrative example of a process for monitoring live customer sessions in accordance with at least one embodiment.

FIG. 7 is an illustrative example of a process 700 that may be used to monitor a live customer session in accordance with example embodiments presented herein. The process 700 may be performed by a tracer system or component thereof, such as the tracer system 401 as described and illustrated in connection with FIG. 4.

The process 700 begins by monitoring, by a plug-in added to a customer browser, a live customer session (702). The plug-in is configured to detect a request transmitted from the browser to a web application (704) and the plug-in, upon or after detecting the transmitted request, transmits a notification to a tracer system providing the parameters or attributes associated with the request (706). A comparison is made based on the information provided by the plug-in, such that the reported log and session logs from the web application are compared to determine the possibility of a compromise to the session or session service (708).

Figure 8:
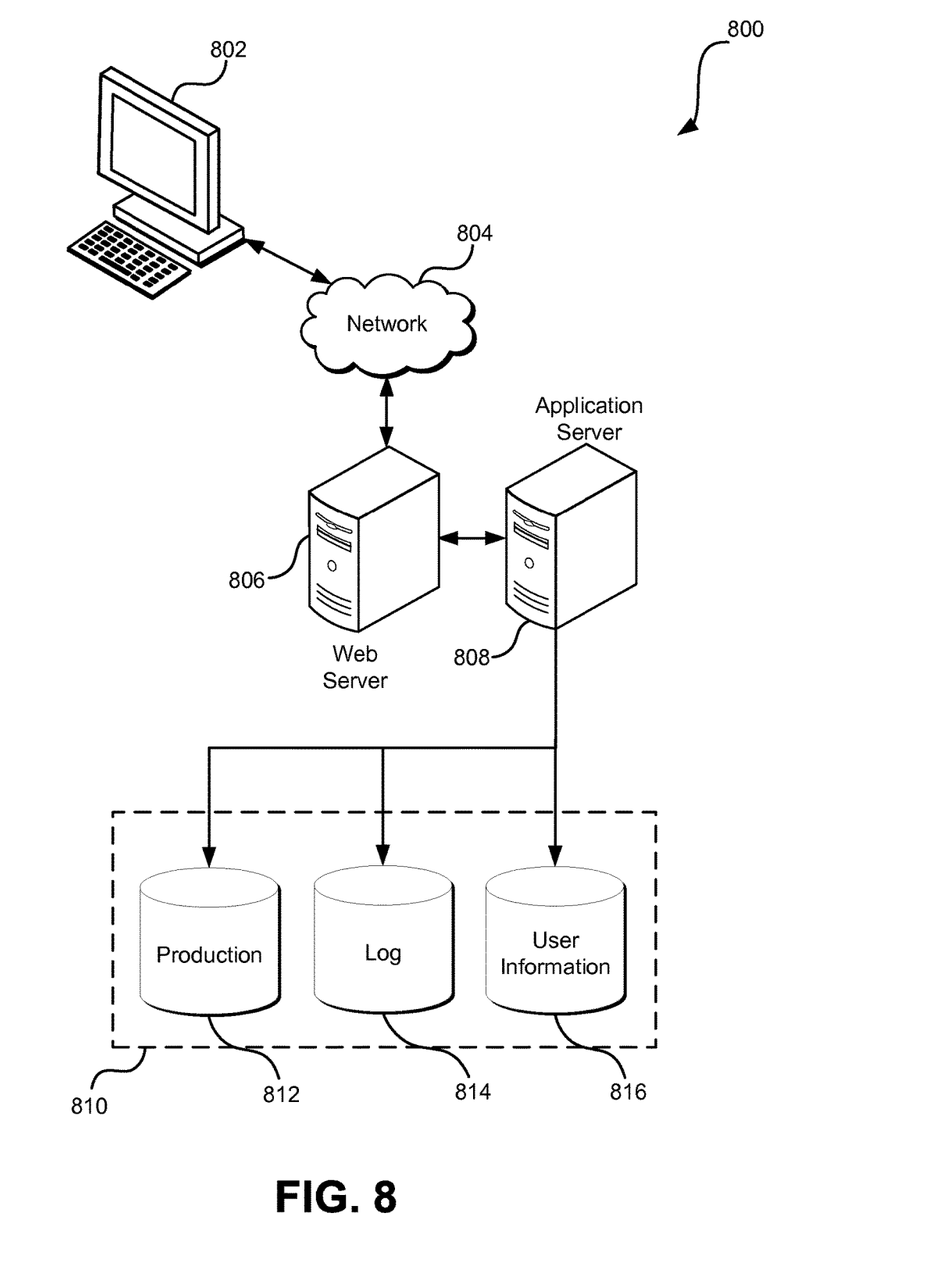
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: $\{A\}$, $\{B\}$, $\{C\}$, $\{A, B\}$, $\{A, C\}$, $\{B, C\}$, $\{A, B, C\}$. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
creating a session of a web application, the session associated with a session identifier encodable in a session cookie usable to submit requests to the web application for the session;
recording information indicative of a number of requests using the session cookie and related to the session;
obtaining server logs for the web application, the server logs including information indicative of a second number of requests using the session cookie; comparing the information indicative of the second number of requests using the session cookie from the server logs and the information indicative of the number of requests using the session cookie and related to the session to determine whether the server logs indicate unexpected activity with the web application in connection with the session;
transmitting one or more notifications as a result of determining that the comparing of the server logs and the information indicative of the number of requests using the session cookie and related to the session indicate unexpected activity with the web application in connection with the session; and
generating emulation session data for use by a malicious attacker associated with the session to emulate an authentic session to prevent the malicious attacker from having access to at least a portion of authentic session data.

2. The computer-implemented method of claim 1, wherein the transmitting one or more notifications includes transmitting a message to require an account associated with the session to re-authenticate, require the account associated with the session to use multi-factor authorization to re-authenticate, or disable the account associated with the session.

3. The computer-implemented method of claim 1, wherein the server logs include a session list including a Uniform Record Locator, a time, a cookie, a request identifier, an Hypertext Transfer Protocol (HTTP) method, query parameters, and session information.

4. The computer-implemented method of claim 1, further comprising:
maintaining a record, the record including information of the session and information of expected behavior of the session associated with the number of requests using the session cookie; and
reconciling the record of the session with the server logs, where the server logs further include a record of actual behavior of the session associated with the second number of requests using the session cookie.

5. A system, comprising:
at least one computing device configured to implement one or more services, wherein the one or more services:
for a session distinguished from other sessions as a result of being created for fraud detection whereby the session includes information indicative of a number of expected requests, perform analysis of server logs to determine whether any requests other than the number of expected requests on the session were received; and
as a result of the analysis indicating that at least one request other than the number of expected requests for the session was submitted by an entity unauthorized to make requests on the session, perform one or more operations corresponding to unexpected activity on the session being detected, the one or more operations including generating emulation session data for use by the unauthorized entity to prevent the unauthorized entity from making malicious requests on the session.

6. The system of claim 5, wherein the one or more services further compare the number of expected requests on the session to a set of requests on the session and recorded in the server logs.

7. The system of claim 5, wherein the one or more services further compare a number of authorized requests on the session to the number of expected requests on the session, the number of authorized requests on the session being greater than zero.

8. The system of claim 5, wherein the one or more services further identify requests made from a client in accordance with an application authorized for request submissions on the session.

9. The system of claim 5, wherein the session is one of a plurality of fraud detection sessions and individual fraud detection session of the plurality of fraud detection sessions are monitored for behaviors designated as indicative of potential compromise.

10. The system of claim 9, wherein the unexpected activity comprises unauthorized access to information usable to submit requests on the session.

11. The system of claim 5, wherein the one or more services further employ an automated agent to generate the requests for a new session.

12. The system of claim 5, wherein the one or more services further determine whether the server logs contain requests that are not present in a record of requests submitted to the session, the record indicating the information indicative of the number of expected requests.

13. A non-transitory computer-readable storage medium having stored thereon executable instructions that, as a result of being executed by one or more processors of a computer system, cause the computer system to at least:
receive a message including a session identifier and properties of a request transmitted from a client to a network-accessible application for a customer session;
obtain a session ledger from a data store operably interconnected to the network-accessible application;
analyze the message including the session identifier, the properties of the request, and the session ledger to determine an indication of compromise based on the message being a request not recorded in the session ledger;
record and/or transmit a notification in response to identifying the indication of compromise; and
generate emulation session data for use by a malicious attacker associated with the session identifier to prevent the malicious attacker from performing one or more malicious actions within the customer session.

14. The non-transitory computer-readable storage medium of claim 13, wherein the message is received from a client application configured to monitor the properties of the request.

15. The non-transitory computer-readable storage medium of claim 13, wherein the executable instructions further cause the computer system to compare attributes of the customer session, wherein the attributes include a time a request was generated, a time a generated request was transmitted, an Internet protocol address of the client, a Uniform Resource Locator, a resource being requested, a cookie, a request identifier, an Hypertext Transfer Protocol (HTTP) method, query parameters, or special event data received.

16. The non-transitory computer-readable storage medium of claim 15, wherein the executable instructions that cause the computer system to compare the attributes of the customer session further cause the computer system to compare raw data or an aggregation of the raw data in a manner that optimizes the comparison of the attributes of the customer session.

17. The non-transitory computer-readable storage medium of claim 14, wherein the executable instructions further cause the computer system to receive the message at a control system from the client application in order to receive a record of behavior that is expected from the client, the record being used to compare actual behavior to the behavior.

18. The non-transitory computer-readable storage medium of claim 17, wherein the executable instructions that cause the computer system to receive a record of expected behavior from the client further cause the computer system to receive the indication of the compromise to the customer session anywhere between the client and the network-accessible application.

19. The non-transitory computer-readable storage medium of claim 13, wherein the executable instructions further cause the computer system to connect a proxy server to a client via a trusted connection, wherein the proxy server is configured to monitor the customer session to determine a device from which the request is received.

20. The non-transitory computer-readable storage medium of claim 19, wherein the executable instructions that cause the computer system to monitor the customer session, by the proxy server, to determine the device from which the request is received further cause the computer system to:
  determine, at the proxy server, when multiple requests for a same session identifier are received from different devices; and
  transmit and/or record, from the proxy server, a notification message, wherein the notification message includes an alarm to indicate a possible session theft.

* * * * *